United States Patent [19]
Boitani

[11] Patent Number: 4,762,210
[45] Date of Patent: Aug. 9, 1988

[54] SMALL CASE EQUIPPED WITH ACCESSORIES FOR PROFESSIONAL TASTERS OF ALCOHOLIC DRINKS

[76] Inventor: Maria Boitani, Via Bissolati, No. 54, 00187 Rome, Italy

[21] Appl. No.: 41,737

[22] Filed: Apr. 21, 1987

[30] Foreign Application Priority Data

Oct. 31, 1986 [IT] Italy .............................. 36222/86[U]

[51] Int. Cl.$^4$ .............................................. A45C 3/00
[52] U.S. Cl. ................................... 190/111; 150/117; 206/217; 190/16
[58] Field of Search .................... 190/16, 17, 109, 110, 190/111; 150/112, 117; 217/7–11; 206/217

[56] References Cited

U.S. PATENT DOCUMENTS

| | | | |
|---|---|---|---|
| 258,814 | 5/1882 | Scott | 190/16 |
| 1,311,586 | 7/1919 | Beecher | 190/16 |
| 2,236,368 | 3/1941 | Haaker | 190/16 X |
| 2,573,763 | 11/1951 | Graham | 190/111 X |
| 2,585,745 | 2/1952 | Crosby | 190/111 |
| 3,335,775 | 8/1967 | Adams | 150/117 X |

Primary Examiner—William Price
Attorney, Agent, or Firm—Wenderoth, Lind & Ponack

[57] ABSTRACT

The present invention relates to a small, rigid case having a rectangular parallelepiped shape that includes a first central front partition and two lateral partitions, a second central rear partition with two lateral partitions, and an additional lateral partition on each respective side of the case defining an additional compartment which is in turn divided internally into a number of compartments. The first central front partition defines a front central compartment that is also divided into parts and provided with a number of seats or housings for crystal-ware. The second central rear partition and lateral partitions thereof have band-type or clamp-type fasteners. Another partition having a convex shape is provided on the top portion of the case. The small rigid case is particularly designed for satisfying the requirements of professional tasters and preparers of alcoholic drinks who give their advice in wine-shops or in wine industries or on similar premises of various kinds.

4 Claims, 4 Drawing Sheets

SMALL CASE EQUIPPED WITH ACCESSORIES FOR PROFESSIONAL TASTERS OF ALCOHOLIC DRINKS

BACKGROUND OF THE INVENTION

The present invention relates to a small case completely equipped with all accessories for professional tasters of alcoholic drinks.

More particularly, the present invention relates to a small, rigid, multi-compartment case designed for use by professional tasters and preparers of drinks who give their advice in wineshops, or wine-cellars or in various similar kinds of premises.

Indeed, as is well known, professionals working in that field go through various wine-cellars of large wine industries, in premises where drinks are offered which are prepared according to particular recipes, and said professionals bring with them all implements and articles which are needed for performing their activities.

The required equipment quite often comprises a whole set of of small metallic implements as well as a whole set of glasses, or crystal implements having larger sizes and being quite brittle.

As can be very easily understood, such professionals are quite strongly bonded to the use of their own implements as the success of the drinks prepared depends very strongly on the implements employed.

The transportation of his own implements is one of the major problems that the wine taster has to solve at the present status of the art because, in order to avoid damage to crystallware, it is packaged so as to occupy an increased volume in a remarkable way and as a consequence, the possibilities of transportation and moving become quite limited.

Professionals of said kind need to employ their own implements to solve the highest possible number of customers' requirements with regard to alcoholic drinks. Such requirements vary from the determination of sugar concentrations in wines to the tasting of the same for determining the right with which to compliment food, and include the creation of particular cocktails while in the meantime, the professionals need to move very easily from place to place without being burdened with bulky luggage.

Accordingly, it is evident that there is a demand for a container capable of containing all implements required by professional tasters of alcoholic drinks, said container being designed so that crystal-ware can be easily transported without breaking and so that all other metallic implements needed can also be easily transported.

SUMMARY OF THE INVENTION

In order to meet such a demand, the present invention suggests a single, rigid container which is divided so as to accommodate all crystal-ware in suitable housings which are obtained in separate spaces so that their contact with one another is avoided and so as to accommodate metallic articles in suitable slots so that no additional internal packaging is needed and so that the container is compact.

Accordingly, it is a specific object of the present invention to provide a small rigid case having a substantially rectangular parallelepipedal shape, said case being characterized in that it comprises a first central front partition and two lateral partitions, a second central rear partition as well as two lateral partitions and, on each side, an additional lateral partition defining a compartment which is in turn divided into a number of internal compartments, said first central partition defining a central compartment being in turn divided into parts and provided with seats or housings designed for containing crystal-ware, said lateral partitions and said second central partition having band-type or clamp-type fastening means, the top portion of said case also bearing a further partition having a convex shape.

According to a further embodiment of the present invention, said first and second central portions of the small case have complementary depths.

Moreover, according to a preferred embodiment of the invention, said second central portion has the same depth as said lateral portions adjacent its sides.

A further advantage of the small rigid case according to the present invention is given by the fact that said central partitions which are present on the short sides and said lateral partitions provided on said first and on said second long side are complementary, the depths of said two lateral portions being equal.

BRIEF DESCRIPTION OF THE DRAWINGS

The present invention will be described now just for illustrative and not for limitative purposes with reference to the enclosed drawings wherein.

DETAILED DESCRIPTION OF THE PREFERRED EMBODIMENTS

Figure 1:
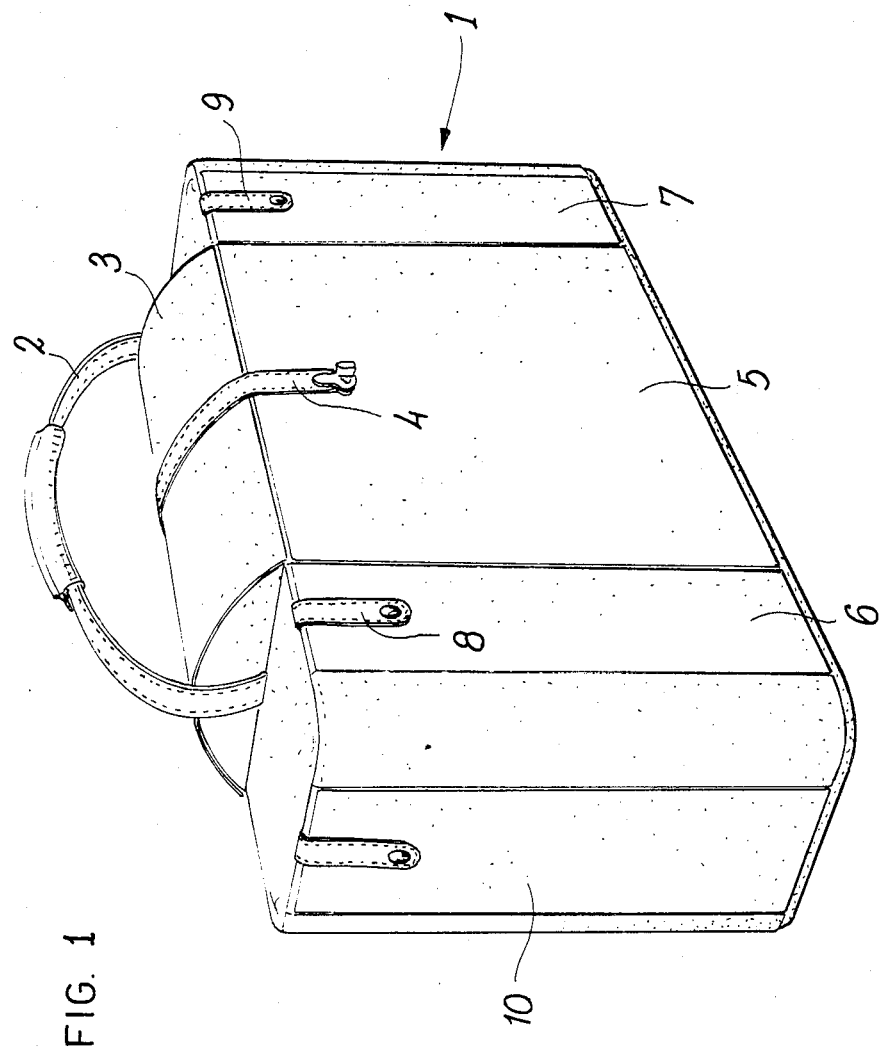
FIG. 1 is a perspective view of the small case according to the invention in a closed state.
Figure 3:
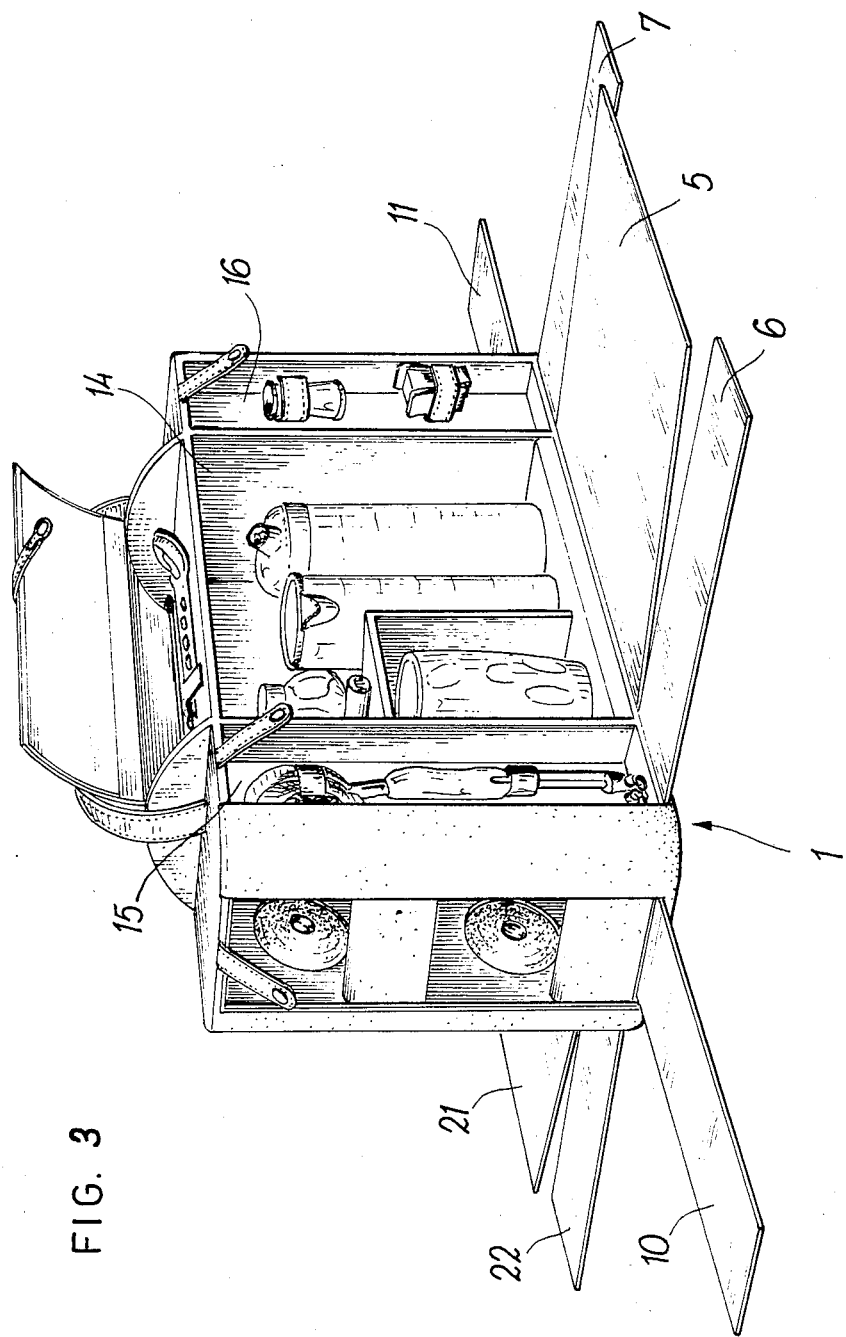
FIG. 3 is a perspective view of the same case in a completely open state, the front being seen.

As is clear from FIG. 1, the parallelepiped case 1 with the handle 2 provided at the top has a central convex top partition 3 that can be partly opened as can be seen better in FIG. 3, and is fastened by a tab 4 to the central portion 5 of one of the front and rear parts.

Laterally with respect to the portion 5, two covers 6 and 7 are provided which are kept closed by the respective tabs 8 and 9 which are provided with snap fasteners and can be opened as shown in FIG. 3.

Similarly, two additional lateral covers 10 and 11 are provided on the sides, said additional covers being closed by the suitable tabs.

As can be clearly seen, the edges of the case of the invention have a rounded shape.

Figure 2:
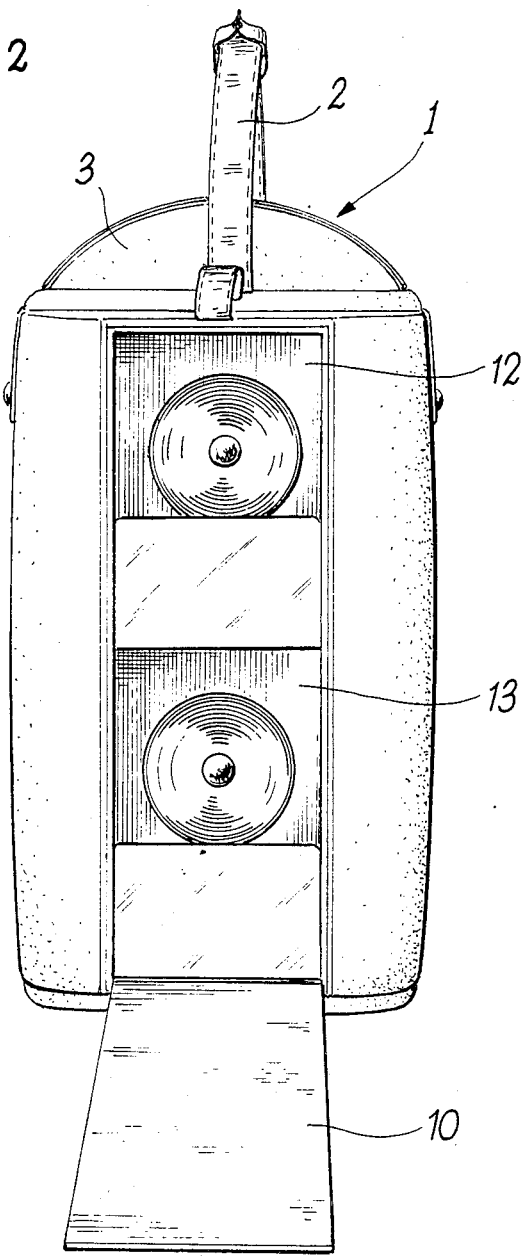
FIG. 2 is a view of a side of the case in an open state.

FIG. 2 shows the compartment underlying the additional lateral portion 10, which is divided into two compartments 12 and 13 provided with suitable seats for crystal-ware, said crystal-ware consisting in the present case, for instance, of glasses.

FIG. 3 clearly shows the objects contained within the compartments defined by the portions 5, 6 and 7, the portions 10 and 11 and the top partition 3.

As can be clearly seen, the front central compartment 14 is deeper than the first lateral compartments 15 and 16 which are provided with bands or clamps for supporting the articles. Moreover, the crystal-ware contained within the compartment 14 as well as glasses contained in the portions 12 and 13 are fastened to suitable housings or seats so that they cannot shift or move or collide during transportation.

Figure 4:
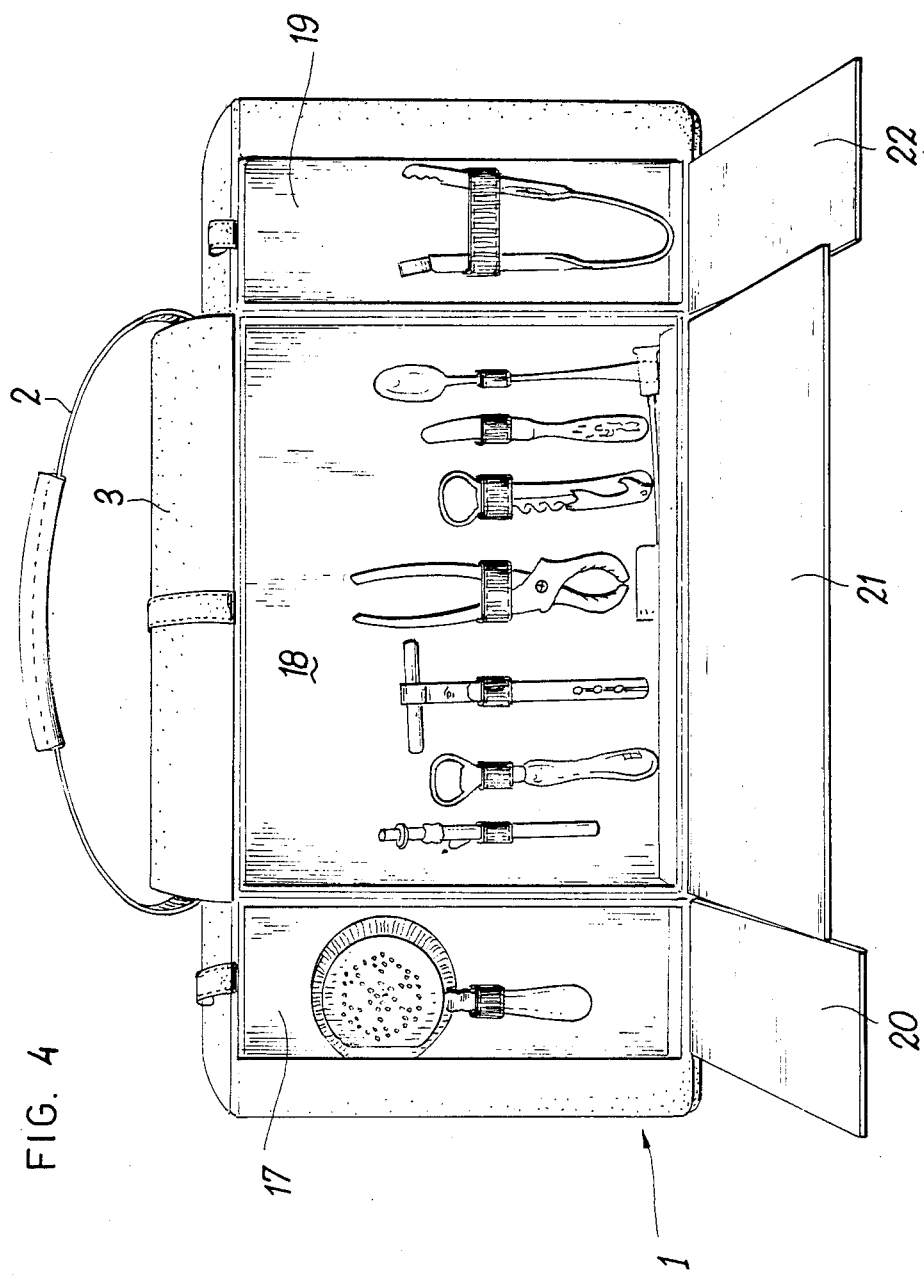
FIG. 4 is a rear view of the case of the invention showing the long side opposite to the side shown in FIG. 3.

FIG. 4 shows finally the arrangement of the objects in the rear central compartment 18 and lateral compartments 17 and 19.

As can be seen in said Figure, the depth of said portions is such that articles having small thicknesses can be housed therein, said articles being fastened to the rear surface of the compartment by means of small bands or clamps having various sizes arranged in an alternate way.

As is obvious, the compartments 17, 18 and 19 also are closed by the respective covers 20, 21 and 22 fastened in a closed position by means comprising tabs and snap fasteners.

The present invention has been disclosed for illustrative and not for limitative purposes and it is to be understood that modifications and changes can be made by those who are skilled in the art without departing from the spirit and scope of the invention for which a priority right is claimed.

What is claimed is:

1. A small rigid case having a generally rectangular parallelepiped shape, said case comprising:
    a first central partition for defining a front central compartment and two lateral partitions for defining respective first lateral compartments each of which is separated from and disposed adjacent a respective side of said front central compartment;
    a second central partition for defining a rear central compartment disposed back-to-back with respect to said front central compartment, and two lateral partitions for defining respective second lateral compartments each of which is separated from and disposed adjacent a respective side of said rear central compartment; and
    two additional lateral partitions for defining two additional lateral compartments each of which extends between and is separated from a respective one of said first lateral compartments and a respective one of said second lateral compartments, said respective ones of said first and said second lateral compartments being disposed adjacent the same respective said side of the front central compartment and the rear central compartment, respectively.

2. A small rigid case as claimed in claim 1,
    wherein said two additional lateral compartments each comprise a plurality of compartments that are separated from one another.

3. A small rigid case as claimed in claim 1,
    and further comprising a top partition comprising a convex partition extending over said front central compartment for defining a top compartment separated from said front central compartment.

4. A small rigid case as claimed in claim 1,
    and further comprising band-type fasteners secured within said rear central compartment and said second lateral compartments for securing implements within said rear central compartment and said second lateral compartments, respectively.

* * * * *